Aug. 12, 1969 C. C. HANSON 3,461,303

VARIABLE THRESHOLD AMPLIFIER WITH INPUT DIVIDER CIRCUIT

Filed Dec. 14, 1966

INVENTOR:
CHARLES C. HANSON
BY Donald F. Voss
ATTORNEY

United States Patent Office 3,461,303
Patented Aug. 12, 1969

3,461,303
VARIABLE THRESHOLD AMPLIFIER WITH INPUT DIVIDER CIRCUIT

Charles C. Hanson, Rochester, Minn., assignor to International Business Machines Corporation, Armonk, N.Y., a corporation of New York Filed Dec. 14, 1966, Ser. No. 601,578
Int. Cl. H03f 1/42, 3/68; G11b 7/00
U.S. Cl. 250—219 9 Claims

ABSTRACT OF THE DISCLOSURE

An amplifier is provided with a divider network for applying a fraction of the maximum input signal as a switching level on a storage capacitor. The stored switching level and the input signal are applied as inputs to a differential amplifier. The differential amplifier is formed by two Darlington pairs to balance out voltage offsets and to prevent loading down the input.

BACKGROUND OF THE INVENTION

Field of the invention.—The invention pertains to variable threshold amplifiers and particularly to those where the switching threshold is adjusted automatically as a function of the maximum input level to tolerate relatively large input variations.

Description of the prior art.—Known variable threshold amplifiers, for example, as shown in Patent 3,189,745 have the input feeding into a high input impedance such as an emitter follower. This slows down the input and also involves larger voltage swings. Also the beta of the emitter follower can be an undesirable variable when the amplifier is used with like amplifiers. This variation would become pronounced as beta changes due to temperature, aging and other like parameters. The present invention has a low input impedance so as not to load down the input. This permits faster operation and at lower voltage levels. Faster operation of the input results in a wide output pulse. A wide output pulse is particularly desirable where the pulse must have a particular time duration to be considered a valid output. Further, voltage offsets are balanced out. This also assists low voltage level operation and renders the switching level relatively insensitive to voltage variations due to temperature and aging.

Summary.—The invention provides an improved variable level threshold amplifier. It overcomes the problem of loading down the input to result in high speed operation and at lower voltage levels. The invention also provides improved stability because voltage offsets are balanced out. Hence the variations in these offsets due to temperature and aging are also balanced out. The invention finds particular utility in machines for reading holes in record cards by means of a light source and phototransistors. The invention tolerates large variations in phototransistor gains and in light level.

Figure 1:
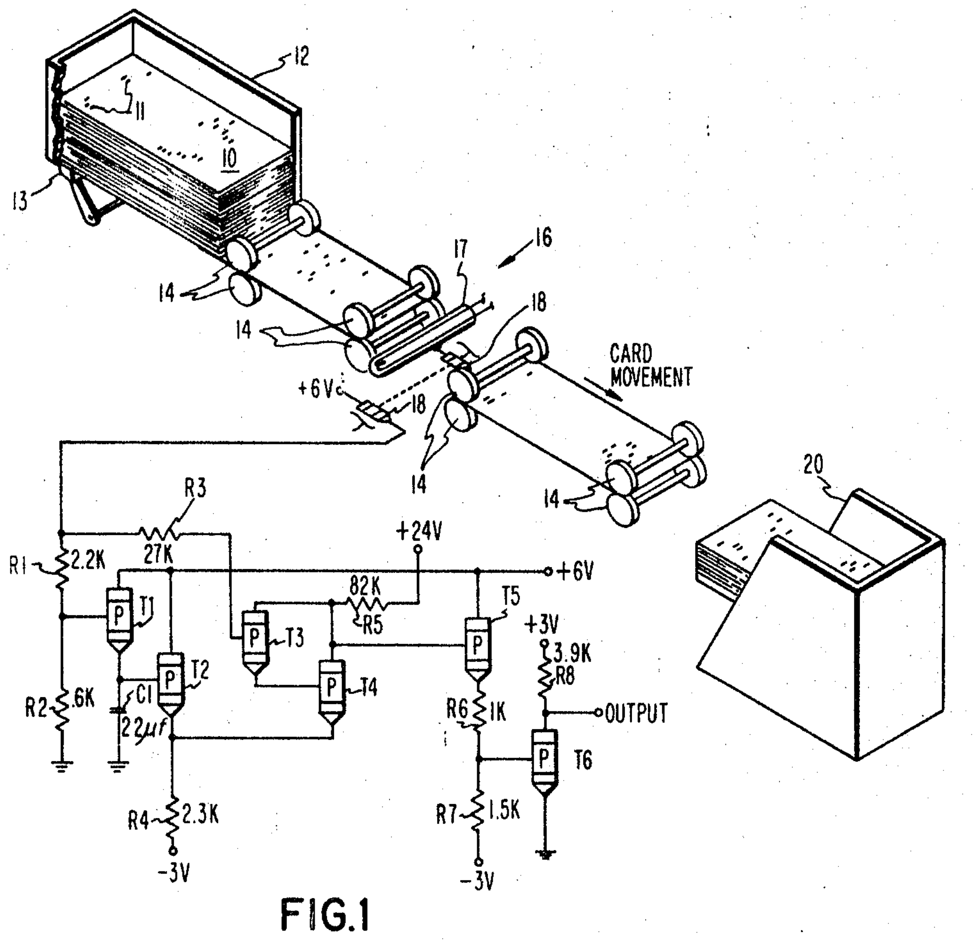
Figure 2:
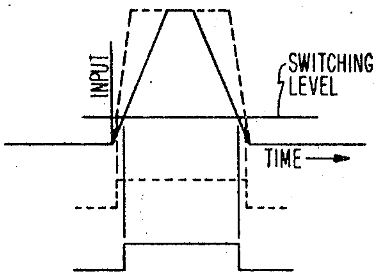
Figure 3:
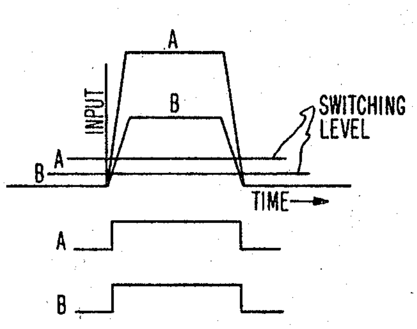

Description of the drawing.—FIG. 1 is a schematic illustration of the invention as embodied in a machine for optically reading holes in punched record cards. FIG. 2 is a diagram illustrating how the input speed affects the width of the output pulse. FIG. 3 is a diagram illustrating how the switching level changes as a function of the maximum input level.

DESCRIPTION

With reference to the drawings and particularly to FIG. 1, the invention is shown by way of example as being incorporated in a machine for optically reading record cards having holes punched therein to represent data in coded form. Record cards 10, having holes 11 are fed from hopper 12 in seriatim by picker knife 13 to cooperating feed rollers 14. Successive sets of cooperating feed rollers 14 then transport the cards relative to an optical read station 16 and from there into a card stacking receptacle 20. Prior to a card coming into the read station, light source 17 fully illuminates phototransistors 18 which are laterally spaced from each other in a direction transverse to the card path. Each phototransistor 18 is in position to read a discrete row or column of index positions at which holes will be present or absent, depending upon whether or not data are to be represented at the particular index positions. The emitter of each phototransistor 18 is connected to an amplifier circuit of this invention. Since each amplifier circuit is the same, only one associated amplifier circuit is shown.

The collector of phototransistor 18 is connected to a +6 volt supply and its emitter is connected to a divider circuit formed by resistors R1 and R2 and to the base of transistor T3 via resistor R3. Resistors R1 and R2 are relatively low impedances. Their values are shown in FIG. 1. One end of resistor R2 is grounded and its other end is connected to one end of resistor R1 in series therewith. The base of transistor T1 is connected to the point connecting the ends of resistors R1 and R2. The emitter of transistor T1 is connected to one plate of a capacitor C1 which has its other plate connected to ground potential. The emitter of transistor T1 is also connected to the base of transistor T2 and the collectors of transistors T1 and T2 are connected to a +6 volt supply to form a Darlington connection. The emitter of transistor T2 is connected in series with resistor R4 which in turn is connected to a −3 volts supply. The emitter of transistor T3 is connected to the base of transistor T4 and the collectors of transistors T3 and T4 are connected to a +24 volt supply via resistor R5. Thus, transistors T3 and T4 form a Darlington connection.

The emitter of transistor T4 is connected to the emitter of transistor T2 to form a differential amplifier therewith. The output from the differential amplifier is taken from the collector of transistor T4. In this particular example, the output from the differential amplifier is applied to the base of transistor T5. Transistor T5 has its collector connected to the +6 volt supply and its emitter connected to one end of resistor R6 which in turn has its other end connected to one end of resistor R7 and to the base of transistor T6. The other end of resistor R7 is connected to a −3 volts supply. The collector of transistor T6 is connected to a +3 volts supply via resistor R8. The emitter of transistor T5 is connected to ground potential.

The function of transistor T1, as will be seen shortly, is to facilitate placing a charge on capacitor C1. Transistor T1 forms a Darlington connection with transistor T2. Voltage offsets, i.e., the base emitter voltage drops of transistors T1 and T2 are balanced out by the voltage offsets of transistors T3 and T4 which also are connected according to the Darlington configuration. The switching threshold stored by capacitor C1 is a predetermined fraction of the maximum input level provided by phototransistor 18. The voltage switching level of the circuit equals $$\frac{R2}{R1+R2}\times V_{in}\text{ peak}\pm\text{differential offset}-\text{capacitor droop}$$

Thus, the switching level is a function of the amount of current conducted by phototransistor 18.

When phototransistor 18 is fully illuminated by light source 17, i.e., in the absence of a card or when a hole is in reading position, phototransistor 18 conducts a maximum amount of current. This maximum amount of current can vary due to variations in the phototransistor gain and variations in the light level of the light source. In this particular example, when the phototransistor is fully illuminated, a minimum of 300 microamps and a maximum of 2.1 milliamps can be tolerated. The maximum input current of 2.1 milliamps occurs when the phototransistor 18 saturates to the +6 volt power supply.

The record cards, in the absence of a hole, either completely block the light from reaching the phototransistor or a certain percentage of the light is transmitted through the card. In this particular example, the amplifier circuit will not switch or provide an output if the amount of light shine-through is limited to approximately 18% of the maximum light level for that particular card. It should be noted that the maximum light level existing at the time of reading any one card is the light level for setting the switching level. Hence, a large opitical variation can take place with respect to this invention, but would not be tolerable if a fixed threshold were used.

Each phototransistor is fully illuminated after a record card leaves the reading station and prior to entry of the subsequent card to be read. Full illumination of the phototransistors 18 causes a maximum amount of current to flow, depending upon the light level at that time. Hence, a switching threshold is set just prior to reading a card. Under the conditions just mentioned, the current conducted by phototransistor 18 and flowing through resistor R1 develops a voltage at the base of transistor T1 to cause the same to conduct, whereby capacitor C1 is charged until a maximum input level is reached. This occurs just prior to the time the leading edge of a card starts to cut off light from phototransistor 18. As light is cut off from phototransistor 18, current flow is reduced and transistor T1 becomes reverse biased and cuts off. The switching threshold is maintained by capacitor C1 for the duration of time necessary to read a card. Also, during the time that the phototransistor 18 is fully illuminated, transistor T2 is conducting but is not saturaed. It has an emitter potential proportional to the charge on capacior C1. Transistors T3 and T4 are saturated. Transistor T5 is conducting a minimum amount and transistor T6 is off. Transistor T6 is off under the conditions just mentioned because its base is negative with respect to its emitter. However, transistor T5 in this particular example, is never off, but conducts a minimum amount when transistor T4 is saturated and conducts a maximum amount when transistor T4 is cut off.

When a card cuts off light from phototransistor 18, transistors T1, T3 and T4 are cut off. Transistor T2 is conducting heavily because of the charge on capacitor C1. It should be noted that capacitor C1 will be discharged slightly as transistor T2 conducts at its heaviest level. With transistor T4 off, the base of T5 is more positive and hence it conducts more heavily than with T4 on. As T5 conducts heavily, the base of T6 goes more positive than its emitter and T6 switches on.

T6 is switched off when the light level on phototransistor 18 is sufficient to develop a voltage which exceeds the switching level on capacitor C1. When this occurs, i.e., when sensing a hole, transistors T3 and T4 are rendered conductive. Transistor T5 conducts to a lesser degree and transistor T6 switches off. Then when the light level on phototransistor 18 decreases, i.e., as a hole goes past the phototransistor, the input goes below the switching threshold and transistors T3 and T4 switch off. This causes T5 to conduct more heavily and transistor T6 switches on. The output pulse from T6 has a duration equal to the time that transistor T6 is off. FIG. 2 illustrates that the output pulse has a longer duration when the phototransistor 18 does not feed into a high impedance. The dashed and solid lines represent the phototransistor outputs when feeding into low and high impedances respectively.

It should be noted that the phototransistor 18 feeds into an impedance of approximately 2.8K. Thus, with a minimum current of 300 microamps, the minimum peak input voltage is approximately 840 millivolts. With a maximum input current of 2.10 milliamps, the maximum input peak input voltage is 5.88 volts. Since the switching level is set between cards the switching level varies as a function of the peak input level. This is illustrated in FIG. 3. The switching level associated with waveform A is greater than the switching level associated with waveform B because the peak of waveform A is greater than the peak of waveform B.

What is claimed is:

1. A variable threshold amplifier comprising:
an input terminal for receiving an input signal,
a resistor divider network having one end connected to said input terminal,
a capacitor,
a first transistor having its base connected to said resistor divider network and its emitter connected to said capacitor,
a second transistor having its base and collector respectively connected to the emitter and collector of said first transistor,
a third transistor having its base connected to said input terminal, and
a fourth transistor having its base and collector respectively connected to the emitter and collector of said third transistor and its emitter connected to the emitter of said second transistor,
said first and second transistors and said third and fourth transistors being connected to form a differential amplifier.

2. The variable threshold amplifier of claim 6 further comprising:
an emitter follower including a transistor having its base connected to the collector of said fourth transistor, and
a transistor connected in a common emitter configuration with its base connected to the output of said emitter follower.

3. A variable threshold amplifier comprising:
a storage capacitor;
an input divider circuit connected to have an input signal applied thereto; and
a differential amplifier having one input connected to one end of said input divider circuit and having another input connected to an internal point of said divider circuit and including a uni-directional current conducting device, said capacitor being connected with said uni-directional current conducting device so as to charge said capacitor to a predetermined fraction of the maximum level of said input signal.

4. A variable threshold amplifier comprising:
a storage capacitor;
an input divider circuit including a first impedance connected at one end to an input terminal and connected at its other end to a second impedance to be in series therewith;
a differential amplifier having a first input connected to a point between said impedances and having a second input connected to said one end of said first impedance, said differential ampilfier including a transistor and said capacitor being connected through said transistor to said first input so that said capacitor is charged to a predetermined fraction of the maximum level of an input signal applied to said divider circuit; and
means for deriving an output signal from said differential amplifier.

5. The variable threshold amplifier of claim 4 wherein said differential amplifier includes another transistor connected in a Darlington configuration with said first-named transistor and third and fourth transistors connected in a Darlington configuration and with said second input, said output signal being derived from the Darlington configuration of said third and fourth transistors.

6. The variable threshold amplifier of claim 5 wherein said impedances are resistors and including another resistor connecting said third and fourth transistors with said second input which has a substantially greater value than either of said first-named resistors.

7. The variable threshold amplifier of claim 5 further comprising an impedance matching and voltage level setting output stage connected to the Darlington configuration of said third and fourth transistors to receive said output signal therefrom.

8. A photo-electric sensing circuit comprising:

a light sensitive element providing a changing current as a function of the intensity of the illumination of the element;

an input divider circuit including first and second impedances connected in series and connected at the remote end of the first one of said impedances directly with said light sensitive element;

a storage capacitor;

a differential amplifier having a first input connected to the junction between said light sensitive element and said first impedance and having a second input connected to the junction between said two impedances, said differential amplifier including a transistor which connects said capacitor to said second input so that said capacitor is charged to a predetermined fraction of the maximum level of an input signal applied to said divider circuit by said light sensitive element; and means for deriving an output signal from said differential amplifier.

9. A photo-electric sensing circuit as set forth in claim 8 wherein said light sensitive element is a phototransistor, said differential amplifier including another transistor connected in a Darlington configuration with said first-named transistor and including also third and fourth transistors connected in a Darlington configuration and with said second input, said output signal being derived from the Darlington configuration of said third and fourth transistors.

References Cited

UNITED STATES PATENTS

| | | | |
|---|---|---|---|
| 3,039,009 | 6/1962 | Gray et al. | 307—315 X |
| 3,189,745 | 6/1965 | Van Reymersdal. | |
| 3,192,388 | 6/1965 | Chen et al. | |
| 3,241,082 | 3/1966 | Van Ligten et al. | 330—30 X |
| 3,302,034 | 1/1967 | Nowell | 307—235 |
| 3,375,450 | 3/1968 | Ayres et al. | 307—235 X |

OTHER REFERENCES

Sowter, Fast Current Threshold Circuit, vol. 8, No. 5, October 1965. IBM Technical Disclosure Bulletin.

RALPH G. NILSON, Primary Examiner

C. M. LEEDON, Assistant Examiner

U.S. Cl. X.R.

307—311; 328—150; 330—30, 69

PO-1050
(5/69)

UNITED STATES PATENT OFFICE
CERTIFICATE OF CORRECTION

Patent No. 3,461,303 Dated August 12, 1969

Inventor(s) Charles C. Hanson

It is certified that error appears in the above-identified patent and that said Letters Patent are hereby corrected as shown below:

In column 4, line 25, "6" should read --1--.

SIGNED AND
SEALED

NOV 4 1969

(SEAL)
Attest:

Edward M. Fletcher, Jr.
Attesting Officer

WILLIAM E. SCHUYLER, JR.
Commissioner of Patents